United States Patent
Herron

(10) Patent No.: US 9,167,750 B2
(45) Date of Patent: Oct. 27, 2015

(54) STUFFER CHUTE FILL INDICATOR

(71) Applicant: AGCO Corporation, Duluth, GA (US)

(72) Inventor: Maynard M. Herron, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 439 days.

(21) Appl. No.: 13/723,411

(22) Filed: Dec. 21, 2012

(65) Prior Publication Data

US 2013/0167739 A1 Jul. 4, 2013

Related U.S. Application Data

(60) Provisional application No. 61/580,755, filed on Dec. 28, 2011.

(51) Int. Cl.
*A01F 15/10* (2006.01)
*A01F 15/08* (2006.01)

(52) U.S. Cl.
CPC ............. *A01F 15/0825* (2013.01); *A01F 15/10* (2013.01); *A01F 15/101* (2013.01); *A01F 2015/102* (2013.01)

(58) Field of Classification Search
CPC ... A01F 15/10; A01F 15/0825; A01F 15/101; A01F 15/102; A01D 43/006
USPC ............. 100/7, 45, 50, 99, 188 R; 56/10.2 R, 56/10.2 C
See application file for complete search history.

(56) References Cited

U.S. PATENT DOCUMENTS

| | | | |
|---|---|---|---|
| 2,823,603 A * | 2/1958 | Collins | 100/179 |
| 2,940,383 A * | 6/1960 | Claas | 100/192 |
| 3,331,314 A * | 7/1967 | Vidrine et al. | 100/192 |
| 7,478,518 B2 * | 1/2009 | Kraus et al. | 56/10.2 R |
| 2002/0029553 A1 | 3/2002 | Schrag et al. | |
| 2003/0106299 A1 | 6/2003 | Vogt et al. | |
| 2003/0159421 A1 | 8/2003 | Trelstad et al. | |
| 2006/0054033 A1 | 3/2006 | Roth | |
| 2007/0245704 A1 | 10/2007 | Kraus et al. | |
| 2011/0023731 A1 | 2/2011 | Matousek et al. | |
| 2012/0000377 A1 * | 1/2012 | Verhaeghe et al. | 100/45 |

FOREIGN PATENT DOCUMENTS

DE 2714760 A1 * 10/1977 ............ A01F 15/00

* cited by examiner

*Primary Examiner* — Jimmy T Nguyen

(57) ABSTRACT

A stuffer chute assembly including: a curvilinear duct defining a passageway, the duct having a lower inlet opening and an upper outlet opening, the duct including a lower surface with plural slots located proximal to the upper outlet; plural rotating devices arranged transversely across the duct, the plural rotating devices extending at least partially both through the plural slots and into the passageway, each of the plural rotating devices including plural fingers along the circumference of the rotating device to engage crop material in the duct; and a sensor coupled to at least one of the plural rotating devices, the sensor configured to sense a parameter corresponding to density of the crop material in the duct.

17 Claims, 8 Drawing Sheets

STUFFER CHUTE FILL INDICATOR

CROSS REFERENCE TO RELATED APPLICATION

This application claims the benefit of U.S. Provisional Application No. 61/580,755, filed Dec. 28, 2011, which is hereby incorporated by reference in its entirety.

TECHNICAL FIELD

The present disclosure is generally related to agricultural machinery, and, more particularly, stuffer chute assemblies for a baler.

BACKGROUND

Agricultural machinery, such as balers, often have a pickup assembly with a row of tines to pick up biomass from the ground and transfer the biomass to bale forming machinery internal to the baler. Such a transfer may rely on a stuffer chute as a transition between a plunger that compresses each charge in a baling chamber and the pickup assembly. To ensure that dense, compact bales are formed in an efficient manner, it is important that each charge be of sufficient density.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
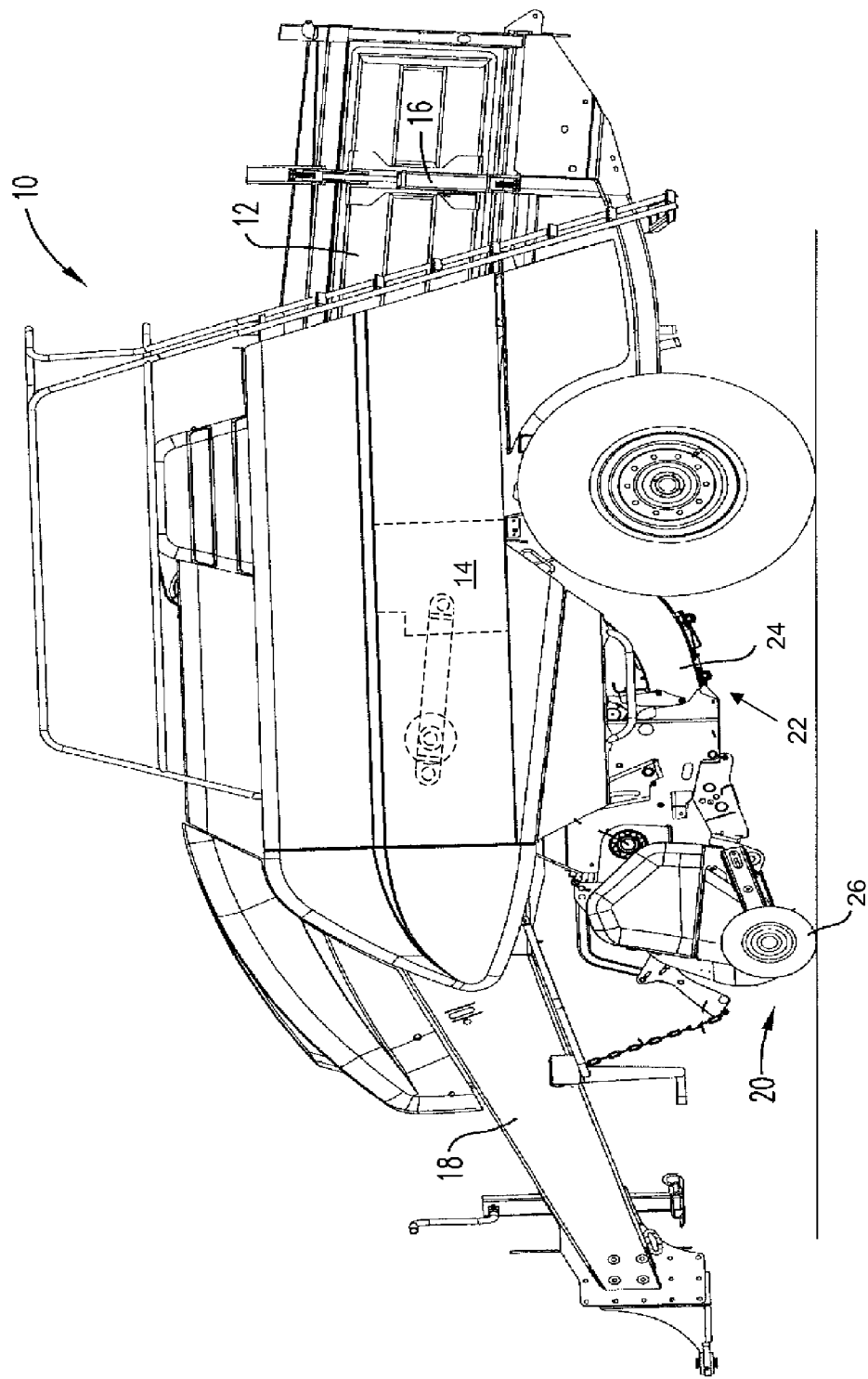
FIG. 1 is a semi-schematic diagram of an example environment in which an embodiment of a stuffer chute fill indicator may be used.

In one embodiment, a stuffer chute assembly comprising: a duct defining a passageway, the duct having a lower inlet opening and an upper outlet opening, the duct comprising a lower surface with plural slots located proximal to the upper outlet; plural rotating devices arranged transversely across the duct, the plural rotating devices extending at least partially both through the plural slots and into the passageway, each of the plural rotating devices comprising plural fingers along the circumference of the rotating device to engage crop material in the duct; and a sensor coupled to at least one of the plural rotating devices, the sensor configured to sense a parameter corresponding to density of the crop material in the duct.

DETAILED DESCRIPTION

Certain embodiments of a stuffer chute assembly and/or associated sub-assemblies and methods are disclosed that enable an agricultural machine (e.g., baler) to more efficiently collect charges of crop material (e.g., biomass, etc.) in a duct for submission to a plunger assembly (or herein, simply plunger) when density or fullness of the collected crop material in the duct has reached or exceeded a predetermined threshold. In one embodiment, a stuffer chute assembly comprises one or more stuffer chute fill indicators, also referred to herein as rotating devices (e.g., a star wheel, or other device with fingers (including tines)), with a variable rotational resistance. For instance, the rotating devices provide no, or an insignificant amount of, change in flow resistance to crop material entering the stuffer chute until the stuffer chute is filled or nearly filled. All or a sub-portion of the rotating devices may be coupled (e.g., connected to, operably coupled, and/or electrically coupled, etc.) to one or more sensors that, upon a parameter corresponding to the flow resistance reaching a predetermined level (as detected or sensed directly or indirectly, or in some embodiments, measured, by the sensor(s)), results in the sensor communicating a signal (e.g., trigger signal) to a controller associated with a stuffer cycle operation, hence activating the stuffer and/or plunger cycle and ensuring a compact and dense charge is provided to the plunger assembly (and hence achievement of compact and dense bales).

In contrast, conventional systems may rely solely on a biased trap door or panel located at the bottom surface of a stuffer chute near an inlet end of the stuffer chute. Such known mechanisms detect the pressure of the accumulated crop material in the stuffer chute, and when pressure builds to a predetermined threshold, the panel triggers (e.g., pushes down), signaling activation of the stuffer cycle operation. Such systems tend to trigger prematurely depending on the nature of the crop material (e.g., due to frictional forces, etc.), often resulting in a less dense charge and flakes with non-uniform density.

Having summarized various features of certain embodiments of a stuffer chute assembly as well as some shortcomings to conventional stuffer chute systems, reference will now be made in detail to the description of the disclosure as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description."

Note that references hereinafter made to certain directions, such as, for example, "front", "rear", "left" and "right", are made as viewed from the rear of the baler looking forwardly.

Referring now to FIG. 1, shown is a semi-schematic diagram of an example baler 10 in which certain embodiments of a stuffer chute assembly may be employed. One having ordinary skill in the art should appreciate in the context of the present disclosure that the example baler 10 is merely illustrative, and that other types of baling devices that utilize stuffer chute assemblies may be implemented, including self-propelled agricultural machines among others. The example environment, depicted in FIG. 1 as a towed square baler 10, has a fore-and-aft extending baling chamber denoted generally by the numeral 12 within which bales of crop material are prepared. In the particular illustrated embodiment, the baler 10 is an "extrusion" type baler in which the bale discharge orifice at the rear of the baler is generally smaller than upstream portions of the chamber such that the orifice restricts the freedom of movement of a previous charge and provides back pressure against which a reciprocating plunger 14 (shown in phantom) within the baling chamber 12 can act to compress charges of crop materials into the next bale. The dimensions of the discharge orifice and the squeeze pressure on the bales at the orifice are controlled by a compression mechanism broadly denoted by the reference numeral 16 in FIG. 1. The baler 10 is hitched to a towing vehicle (not shown) by a fore-and-aft tongue 18, and power for operating the various mechanisms of the baler may be supplied by a power take-off (PTO) of the towing vehicle, though not limited as such.

The baler 10 is depicted as an "in-line" type of baler wherein crop material (e.g., biomass) is picked up below and slightly ahead of baling chamber 12 and then loaded up into the bottom of chamber 12 in a straight line path of travel. A pickup assembly broadly denoted by the numeral 20 is positioned under the tongue 18 on the longitudinal axis of the machine, somewhat forwardly of the baling chamber 12. A stuffer chute assembly 22 is generally shown, and includes a charge forming duct 24 that in one embodiment is curvilinear in shape. In some embodiments, the duct 24 may comprise a straight duct configuration, among other geometries. For instance, the duct 24 extends generally rearwardly and upwardly from an inlet opening just behind the pickup assembly 20 to an outlet opening at the bottom of the baling chamber 12. The plunger 14, as is known, reciprocates within the baling chamber 12 in compression and retraction strokes across the opening at the bottom of the baling chamber 12. In the portion of the plunger stroke forward of the opening, the plunger 14 uncovers the duct outlet opening, and in the rear portion of the stroke, the plunger 14 completely covers and closes off the outlet opening.

The duct 24 defines an internal passage (also, referred to herein as a passageway) through which crop material travels from the pickup assembly 20 to the baling chamber 12 during operation of the baler 10. The front end of the duct 24 is open to present an inlet (e.g., inlet opening) into the internal passage, and an outlet (e.g., outlet opening) of the duct 24 is defined by the opening into the baling chamber 12. A top wall of the duct 24 is defined by a series of laterally spaced apart straps that extend downwardly and forwardly from the baling chamber 12 and terminate in forwardmost upturned front ends generally above the inlet to the duct 24. The rear of pickup assembly 20 has a centrally disposed discharge opening defined in part by a transition pan, in fore-and-aft alignment with the inlet to the duct 24, as is known.

The pickup assembly 20 has a pair of ground wheels 26 (one shown) that support the pickup assembly 20 as the baler 10 advances along the ground. The pickup assembly 20 is mounted to the front chassis of the baler 10 for pivoting movement about an upwardly and rearwardly disposed transverse pivot axis. Flotation for the pickup assembly 20 may be provided by a number of different flotation mechanisms well-known in the art. In some embodiments, at least a portion of crop material may be directly received from the towing vehicle (e.g., a combine) at the baler 10 without a pickup 20.

A relatively short, transversely channel-shaped chute (e.g., transition pan) projects rearwardly from the pickup assembly 20 and is slidably received within the front end of the duct 24. The chute serves as a transition piece between the pickup assembly 20 and the duct 24 for crop flow as the pickup assembly 20 rises and falls over uneven terrain relative to the duct 24 during operation.

The baler 10 may further comprise a feeding mechanism for moving crop materials through the duct 24. Such feeding mechanism may, for example, comprise a suitable rotor associated with a cutter mechanism, or it may comprise other apparatus or be omitted in some embodiments. In some embodiments, the feeding mechanism may include a packer and a stuffer as is conventional and well understood by those skilled in the art. The packer is used to receive materials from the pickup assembly 20 and pack the same into the duct 24 for preparing a precompressed, preshaped charge of crop materials that conforms generally to the interior dimensions of the duct 24. The stuffer, as is explained further below, cooperates with the stuffer chute assembly 22 to sweep (e.g., using a rake that travels through its own kidney shaped path of travel) the prepared charge up into baling chamber 12 between compression strokes of the plunger 14 when the opening at the floor of the baling chamber 12 is uncovered. Certain embodiments of the stuffer chute fill indicator are disposed at least in part in the stuffer chute assembly 22 proximal to the baling chamber 12.

Figure 2A:
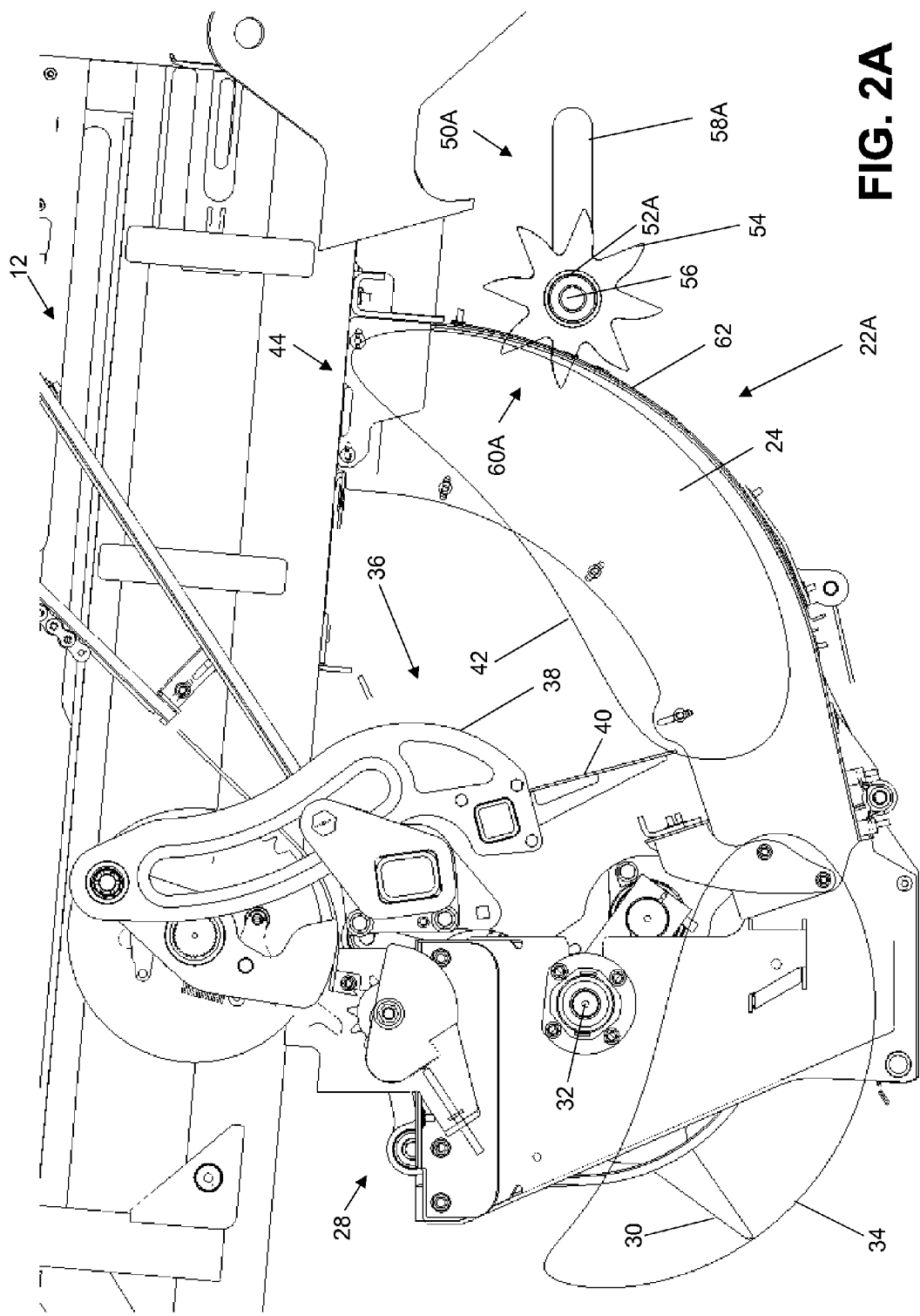
FIG. 2A is a side elevation, fragmentary view of an example stuffer chute assembly comprising one embodiment of a stuffer chute fill indicator.
Figure 2B:
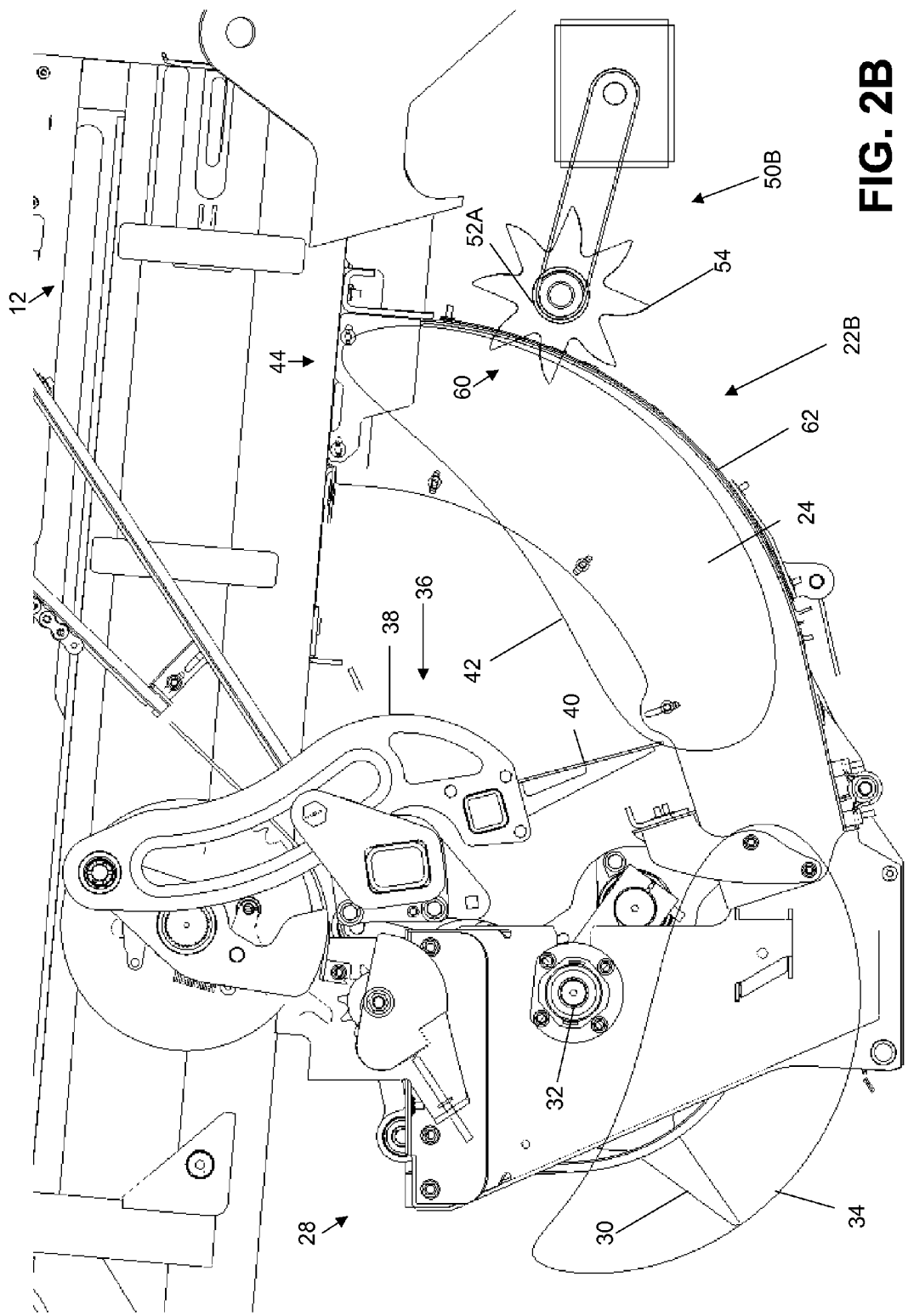
FIG. 2B is a side elevation, fragmentary view of an example stuffer chute assembly comprising another embodiment of a stuffer chute fill indicator.

Having generally described an example baler 10, attention is directed to the stuffer chute assembly 22 (22A and 22B) shown in side elevation view in FIGS. 2A and 2B. The stuffer chute assembly 22A of FIG. 2A comprises one embodiment of a stuffer chute fill indicator, and the stuffer chute assembly 22B of FIG. 2B comprises another embodiment of a stuffer chute fill indicator. One having ordinary skill in the art should appreciate in the context of the present disclosure that the example stuffer chute assembly 22 and cooperating elements and/or sub-assemblies are merely illustrative, and that other types of configurations may be implemented in some embodiments. In the depicted example shown in FIGS. 2A-2B, a packer 28 is show proximal to the front of the stuffer chute assembly 22, the latter which comprises the duct 24 as shown. Crop material may be transferred from the pickup assembly 20 (FIG. 1, or in embodiments not utilizing a pickup assembly 20, bypassed and deposited directly from the towing vehicle) to a transition pan. Packing forks 30 can grab at least a portion of the crop material collected on the transition pan and move the crop material back to the duct 24. The packing forks 30 may be mounted along a crankshaft 32 (shaft shown in end view) and controlled by control links for moving the tips of the packing forks 30 in a generally kidney-shaped path of travel 34. The packer 28 is thus used to receive materials from the pickup assembly 20 and pack the same into the duct 24 for preparing a precompressed, preshaped charge of crop material that conforms generally to the interior dimensions of the duct 24 while the opening to the baling chamber 12 (the outlet of the duct 24) is closed by a holding element.

A stuffer 36 comprises a rake 38 with plural fingers (also, referred to as tines or forks) 40. The stuffer 36, as is conventional and well understood by those skilled in the art, cooperates with the passageway of the duct 24 and, in particular, functions to sweep through its own kidney shaped path of travel 42 to sweep the prepared charge of crop material in the duct 24 up into baling chamber 12 (via opening or outlet 44) between compression strokes of the plunger 14 when the opening to the baling chamber 12 is uncovered.

Figure 3A:
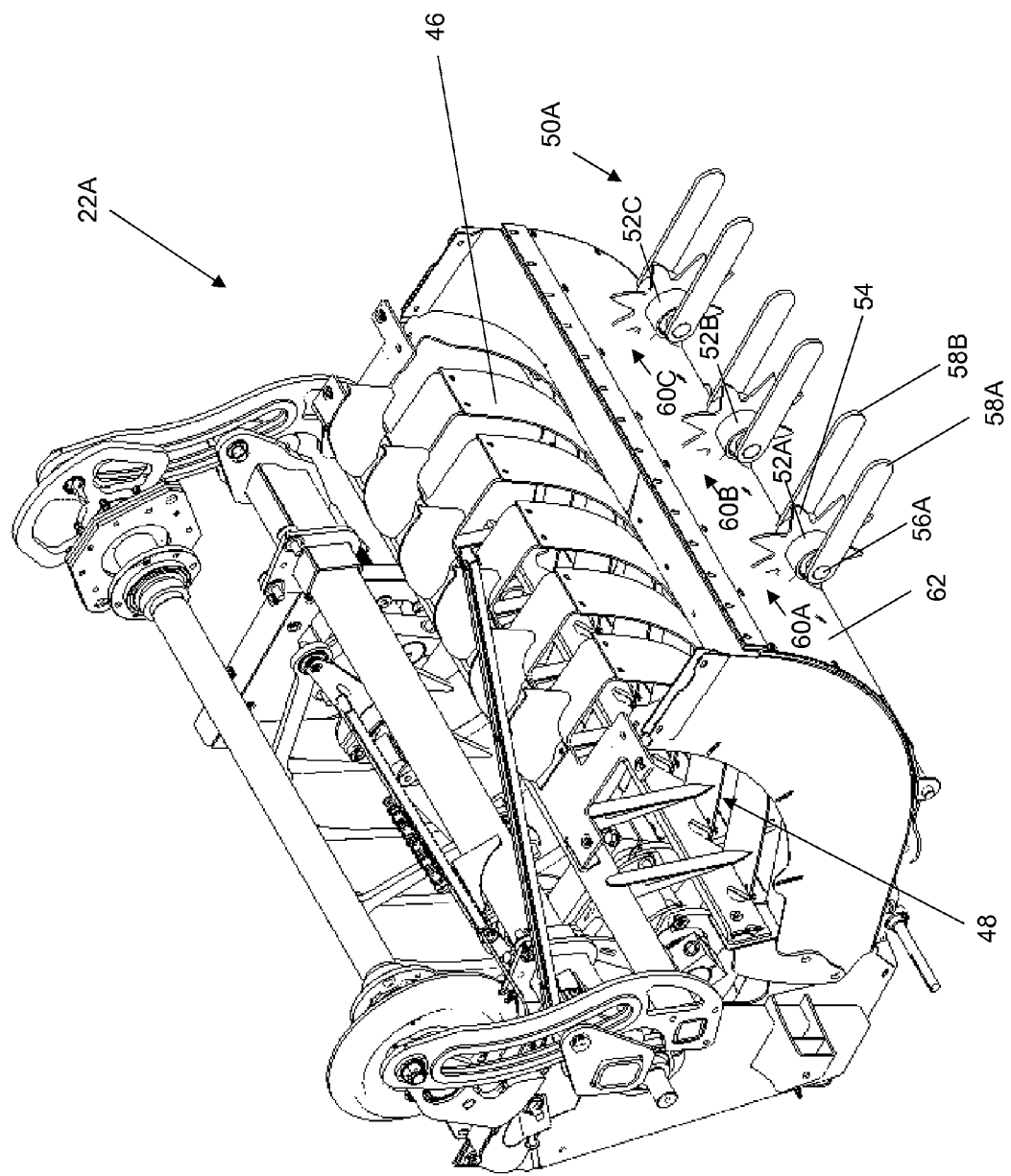
FIG. 3A is rear perspective, fragmentary view of the example stuffer chute assembly and stuffer chute fill indicator of FIG. 2A.
Figure 3B:
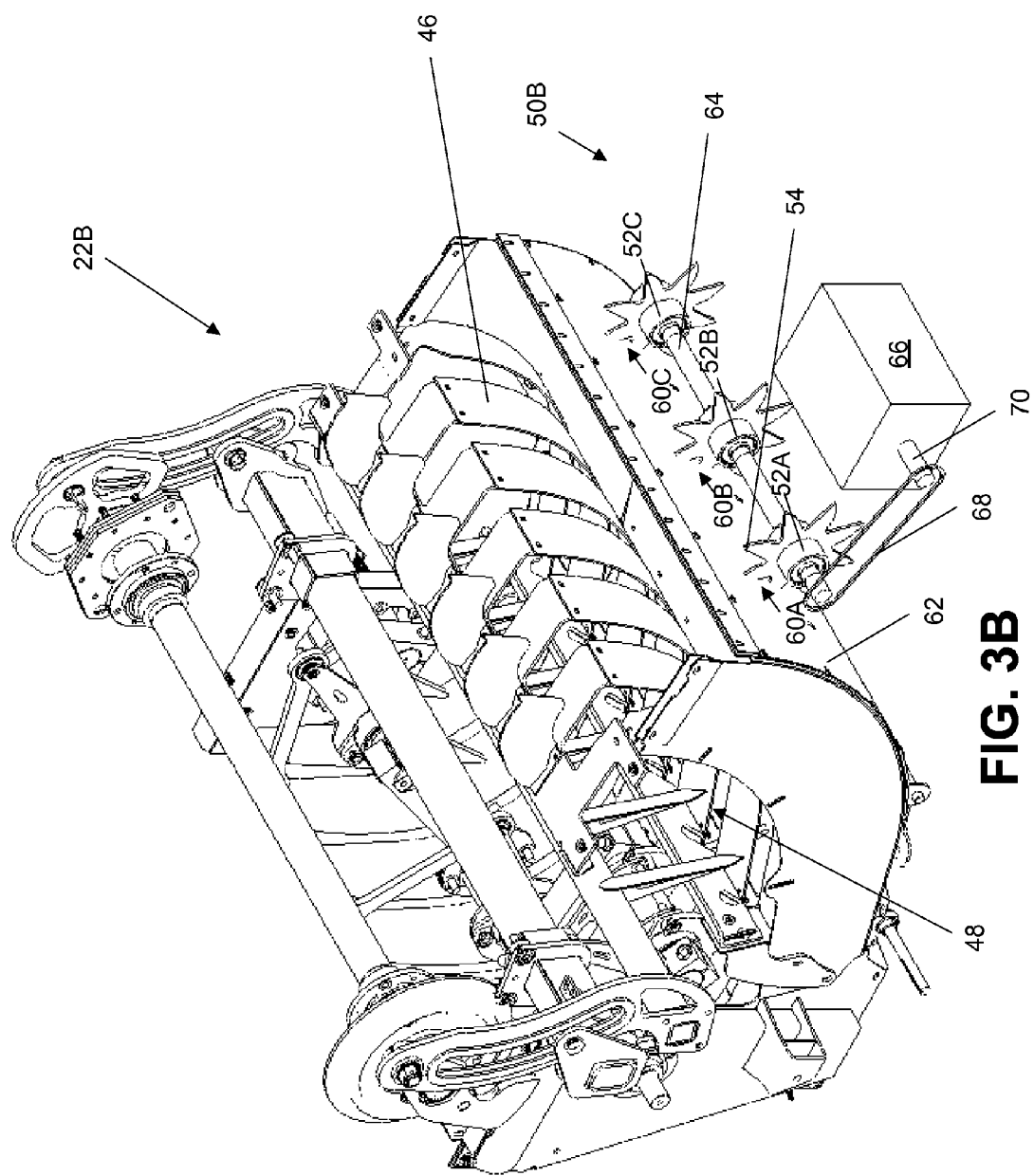
FIG. 3B is rear perspective, fragmentary view of the example stuffer chute assembly and stuffer chute fill indicator of FIG. 2B.

For instance, and referring to FIGS. 3A-3B (with continued reference to FIGS. 2A-2B), at least a portion of a top wall of the duct 24 is defined by a series of laterally spaced apart straps 46 that extend downwardly and forwardly from baling chamber 12 and terminate generally above the inlet of the duct 24. The rear of pickup assembly 20 has a centrally disposed discharge opening, in fore-and-aft alignment with the inlet opening to the duct 24. The fingers 40 of the rake 38 each extend into a respective gap 48 among plural gaps as part of the sweeping motion of the rake 38.

Referring now to FIGS. 2A and 3A, shown is one embodiment of a stuffer chute fill indicator system 50A comprising a plurality of stuffer chute fill indicators that include one or more rotating devices 52 (e.g., 52A, 52B, and 52C, where a quantity of three (3) is shown in FIG. 3A, though other quantities of rotating devices may be used in some embodiments) of the stuffer chute assembly 22A. Attention is focused on rotating device 52A, with the understanding that a similar description applies to the other rotating devices 52B-52C. The rotating device 52A is depicted as a star wheel, with plural fingers 54 disposed around the circumference of the device 52A. Though shown with eight (8) fingers 54 in FIGS. 2A and 3A, it should be appreciated that a different quantity of fingers 54 may be used in one or more of the rotating devices 52 in some embodiments. Further, though shown as a star wheel, other types of configurations may be employed in some embodiments that function to engage the crop material in the duct 24 and rotate independently and either passively or actively with variable rotational resistance depending on the density of crop material located in the duct 24. For instance, in an active embodiment, each rotating device 52A may be energized by a dedicated motor for each device. The rotating device 52A comprises a shaft 56A that acts as a pivot point for the rotating device 52A. At opposing ends of the shaft 56A are brackets 58A and 58B, which support the rotating device 52A and shaft 56A on one end proximal to the duct 24, and at the other end, are secured to a frame (not shown in FIGS. 2A and 3A) of the baler 10 (FIG. 1).

At any given time, a portion of the fingers 54 of each of the rotating devices 52 is disposed in a respective one of plural slots 60 (e.g., 60A, 60B, and 60C) in a lower surface 62 of the duct 24. In one embodiment, the slots 60 are at the same height distributed transversely across the lower surface 62 at a location proximal to the outlet 44 of the duct 24. In some embodiments, the slots 60 (and protruding fingers 54 of the rotating devices 52) may be offset vertically. Referring in particular to the slot 60A and rotating device 52A (with the same or similar applicability to the other slots 60B-60C and rotating devices 52B-52C), the slot 60A is of a suitable area to reduce or prohibit the egress of crop material from within the duct 24 while enabling a portion of the length of the fingers 54 to extend therethrough to engage the crop material within the duct 24. In other words, the slot 60A is located in the lower surface 62 of the duct 24, proximal to the outlet 44 of the duct 24, and large enough to permit the fingers 54 of the rotating device 52A to enter and leave (e.g., as the rotating device 52A rotates) the passageway of the duct 24 while allowing any residue crop material to be stripped from the fingers 54 upon exiting the passageway of the duct 24. Note that the fingers 54 are shown as curved fingers in FIGS. 2A and 3A, though in some embodiments, may be straight-edged, and in some embodiments, may be a combination of curved and straight-edged. In some embodiments, an additional portion or structure of the rotating device 52A may extend into the passageway of the duct 24 than the amount shown in FIG. 2A.

Referring to FIGS. 2B and 3B, shown is another embodiment of a stuffer chute indicator system 50B. Similar to the stuffer chute fill indicator 50A of FIGS. 2A and 3A, the stuffer chute fill indicator 50B comprises one or more (e.g., three (3) in this example though not limited to three) rotating devices 52 (e.g., 52A-52C). Focusing on rotating device 52A (with the same or similar applicability to rotating devices 52B-52C), the rotating device 52A comprises plural (e.g., eight (8) in this example, though not limited to eight) fingers 54 that are coupled to the circumference of the rotating device 52A and which extend in part past the bottom surface 62 and into the passageway of the duct 24 through the slot 60A. In other words, at any given time, there is a portion of the plural fingers 54 of the rotating device 52A that extends through one slot 60A among plural slots (60B-60C), actively engaging and influencing the advance of the crop material to the outlet 44 of the duct 24. Each of the rotating devices 52A-52C is fixably coupled to a common shaft 64. The common shaft 64 is actively rotated by a drive mechanism comprising a gear box 66 (e.g., powered by the power take-off (PTO) of the towing vehicle coupled to a hydraulic pump and motor, or in some embodiments, powered by other motive forces such as electric power residing on the baler 10 as would be appreciated by one having ordinary skill in the art) and associated drive shaft 70. In other words, the gear box 66 comprises one or more gears that are operably coupled to the drive shaft 70, which is coupled to the common shaft 64 by a belt 68. As the gears of the gear box 66 are rotated, the drive shaft 70 rotates, causing the motion of the belt 68 and through its coupling to the common shaft 64, rotation of the common shaft 64. The rotation of the common shaft 64 causes rotation of each of the rotating devices 52, which upon engagement of the crop material by the fingers 54 of the rotating devices 52, assists in influencing the crop material flow toward the outlet 44 of the duct 24. In some embodiments, the gear box 66 may be omitted, and a passive, variable resistance may be employed.

Figure 4A:
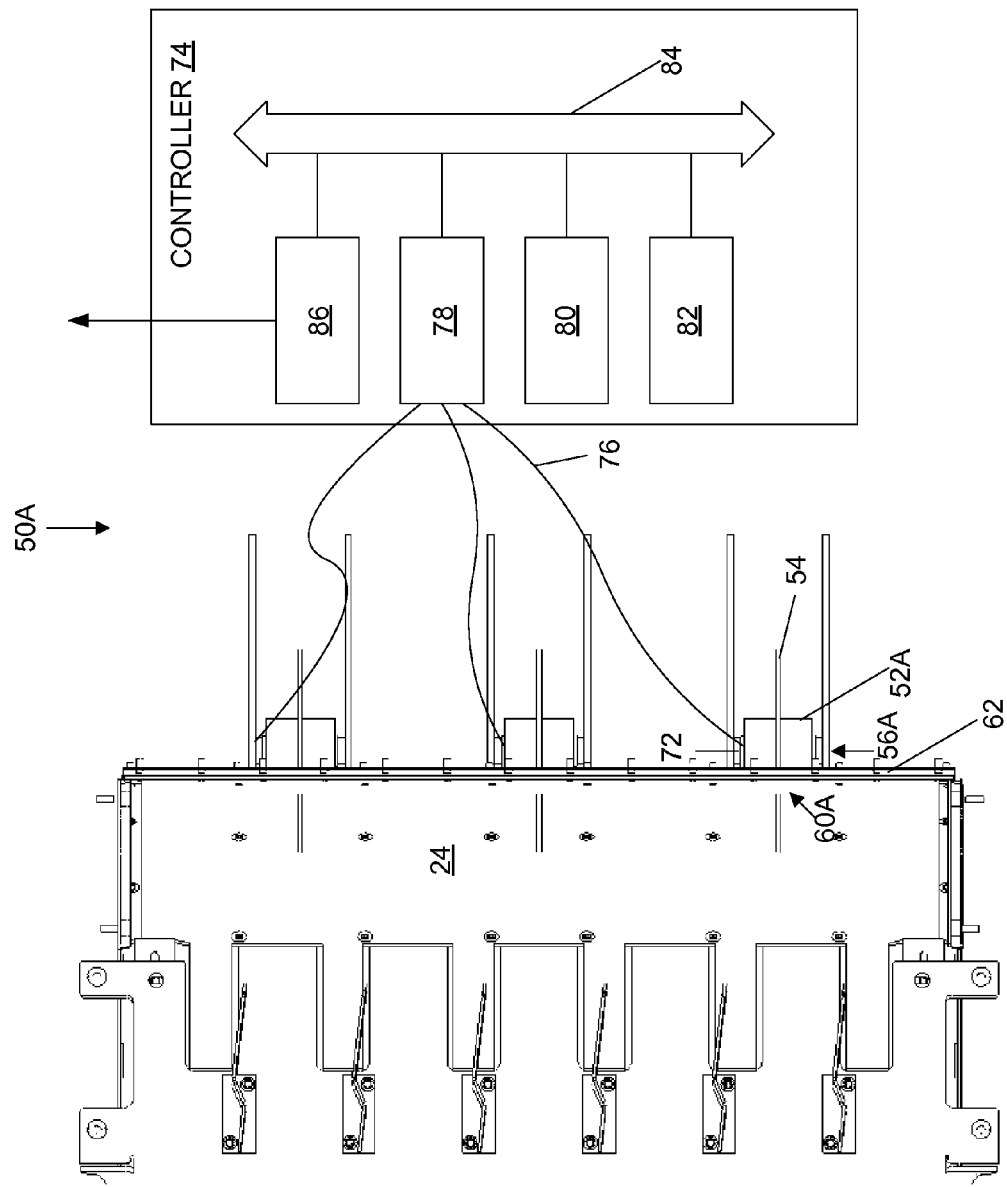
FIG. 4A is an overhead plan, fragmentary view of the example stuffer chute assembly and stuffer chute fill indicator of FIG. 2A with controls.
Figure 4B:
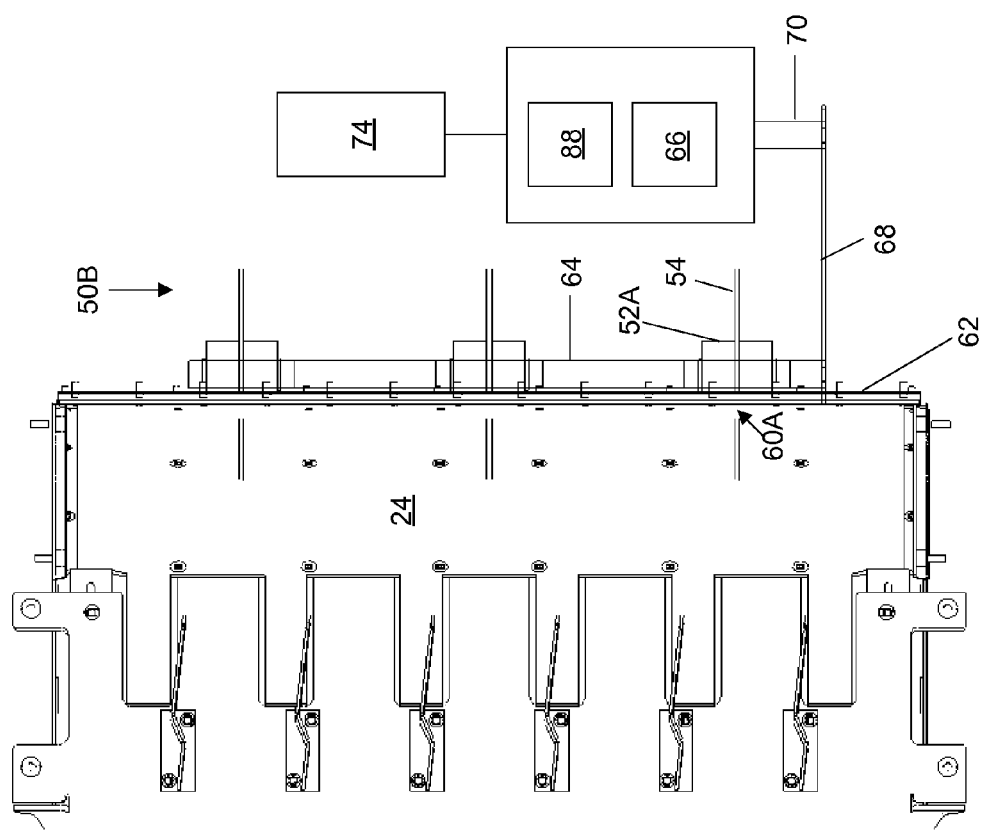
FIG. 4B is an overhead plan, fragmentary view of the example stuffer chute assembly and stuffer chute fill indicator of FIG. 2B with controls.

Attention is directed now to FIGS. 4A and 4B, which illustrate in overhead plan view a combination block and schematic diagram of certain embodiments of control and sensing mechanisms of the stuffer chute fill indicator systems 50. Referring to FIG. 4A, a passive rotating arrangement is depicted, with the three (3) rotating devices 52. Each rotating device 52 has plural fingers 54, with a portion of those fingers 54 at any one time extending at least in part into the passageway of the duct 24 through the slots 60 in the lower surface 62. Focusing once again on rotating device 52A (with similar applicability to the other rotating devices 52B-52C), the shaft 56A of the rotating device 52A is independent of respective shafts of the other rotating devices 52. One or more of the rotating devices 52, such as rotating device 52A, comprises a sensor 72 that is coupled (e.g., affixed, operably coupled, etc.) to the shaft 56A and/or to the rotating device 52A. In the embodiment depicted in FIG. 4A, all of the rotating devices 52 have a corresponding sensor. In some embodiments, the sensor 72 may be coupled to other locations such as to one of the fingers 54 (e.g., a piezoelectric sensor, strain gauge, etc.). As mentioned above, in some embodiments, the sensor 72 may be coupled to only a subset of the rotating devices 52 (e.g., one of them), or there may be additional sensors coupled to one or more of the rotating devices 52B-52C (or their respective shafts, fingers, etc.).

The sensors 72 signal (e.g., trigger signal) to a controller 74 over respective wiring 76 (or consolidated proximal to the rotating devices 52 and sent over a single wire, or wirelessly in some embodiments) either continuously or responsive to a sensed parameter reaching or exceeding a (predetermined) threshold value. The parameter sensed corresponds to (e.g., directly or indirectly) the density or fullness of the crop material residing in the duct 24 as a charge. For instance, the parameter may be directly sensed, such as pressure (e.g., sensed in the passageway of the duct 24, such as via a sensor affixed to one or more fingers 54 of one or more rotating devices 52), or indirectly sensed, such as rotational resistance or torque of each shaft, such as shaft 56A, according to mechanical (e.g., force) or electrical (e.g., current, power, voltage drop) feedback from the sensor 72. In one embodiment, and referring to rotating device 52A, the rotating device 52A (and hence the shaft 56A) rotates according to a variable rotational resistance. For instance, no change in flow resistance may correspond to a parameter value less than the predetermined threshold, and when the duct 24 is full or substantially full, providing increased resistance to rotation, the sensed parameter has reached or exceeded the predetermined threshold value.

In one embodiment, the controller 74 comprises an interface 78 to receive the signaling (e.g., trigger signal) from the sensors, such as sensor 72, via wiring 76. In some embodiments, the trigger signal may be received wirelessly. The signaling (including a formatted version thereof) is received by a processor 80 residing in the controller 74. The processor 80 is configured by software and/or firmware in memory 82 to cause timed (e.g., synchronous) activation of stuffer and plunging operations. For instance, the processor 80 may signal over data bus 84 to an output interface 86 (e.g., CAN interface, etc.) to actuate the rake sweeping movement, plunging operation, and/or in some embodiments, the rotating device operation (e.g., prevent rotation in a counter-clockwise direction to serve a holding finger function, as described further below). Hence, stuffing and plunging operations are made more efficient since actuation is based on a desired charge density. Note that actuation may embody on/off operation of a switch (e.g., relay, contactor), such that a circuit is closed to complete a circuit comprising an electronic solenoid, hydraulic cylinder, actuator or motor of a stuffer clutch assembly and/or plunger mechanism. In some embodiments, the controller 74 may cause one or more of these operations to commence via one or more intermediate controlling or actuating devices. As explained above, in some embodiments, the rotating devices 52 may be actively driven by a respective motor coupled to the respective shaft 56.

Referring now to FIG. 4B, shown is another arrangement of the rotating devices 52, referred to herein as an active rotating arrangement, for the stuffer chute indicator system 50B. Shown in overhead plan view is the duct 24, with a lower surface 62 in which the slots, such as slot 60A, are disposed to enable the rotating devices 52 to extend into the passageway of the duct 24. In particular, and referring to the rotating device 52A (with similar applicability to the other rotating devices 52B and 52C), the rotating device 52A comprises plural fingers 54, a portion of which extends through the slots 60A at any given time. Also shown is the common shaft 64, which is coupled to all of the rotating devices 52. The shaft 64 is coupled to the drive shaft 70 via the belt (or chain in some embodiments) 68. The drive shaft 70 is driven by gear mechanisms in the gear box 66. In one embodiment, the gear box 66 is coupled to detection circuitry 88 (also referred to as a sensor) that senses the torque (e.g., directly, or via current, voltage, or power sense) change when the common shaft 64 (and hence rotating devices 52) encounter resistance due to a filled or substantially filled duct 24. The gear box 66 may continuously drive the shaft 70 (or in some embodiments, intermittently), which drives the common shaft 64, and upon the rotating devices 52 encountering resistance in moving the crop material along in the duct 24, the torque (or current draw, or other sensed parameter) increases. The detection circuitry 88 sends a trigger signal to the controller 74, which causes further control signaling as similarly described above. In some embodiments, the circuitry for the detection circuitry 88 and/or the controller 74 may be embodied in the gear box 66 as a single unit. In some embodiments, additional sensors or different locations for sensors may be used. In some embodiments, as indicated above, the driving mechanism (e.g., gearbox 66) may be omitted, and a passive arrangement may be achieved with the variable resistance sensed by the detection circuitry 88 or by one or more sensors 72 coupled directly to the common shaft 64 and/or rotating device 52 and communicating the trigger signal to the controller 74.

In some embodiments, the controller 74 may logically AND (or in some embodiments, logically OR) the signal received from the one or more sensors 72 in FIG. 4A (or detection circuitry 88 in FIG. 4B) and a signal from a sensor located toward the inlet of the duct 24 (e.g., associated with a conventional biased trap door or panel) before activating, by the controller 74, a stuffer cycle.

One or more functions of the controller 74 may be implemented in hardware, software, firmware, or a combination thereof. In the embodiments depicted in FIGS. 4A-4B, the controller 74 comprises executable code stored in memory 82, the executable code comprising software or firmware that is executed by a suitable instruction execution system. If certain functionality is implemented in hardware, the functionality may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The software or firmware for the controller 74, which each may comprise an ordered listing of executable instructions for implementing logical functions, can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions.

As indicated above, the rotating devices 52 may also serve another function of preventing the return of crop material back toward the inlet of the duct 24 (e.g., in a second direction from top to bottom). For instance, the rotating devices 52 may be prevented from rotating in a counter-clockwise direction, such as always in one embodiment, or as signaled (e.g., particularly in passive embodiments where the rotation of the wheel may be prevented from rotating in a counter clockwise direction via an electromagnetic switch or braking mechanism). In some embodiment, a holding finger (not shown) may be used in conjunction with the rotating devices 52, or in some embodiments, the holding finger may solely perform this function (e.g., where the uni-directional nature (always or as signaled) of the rotating devices 52 is omitted).

Figure 5:
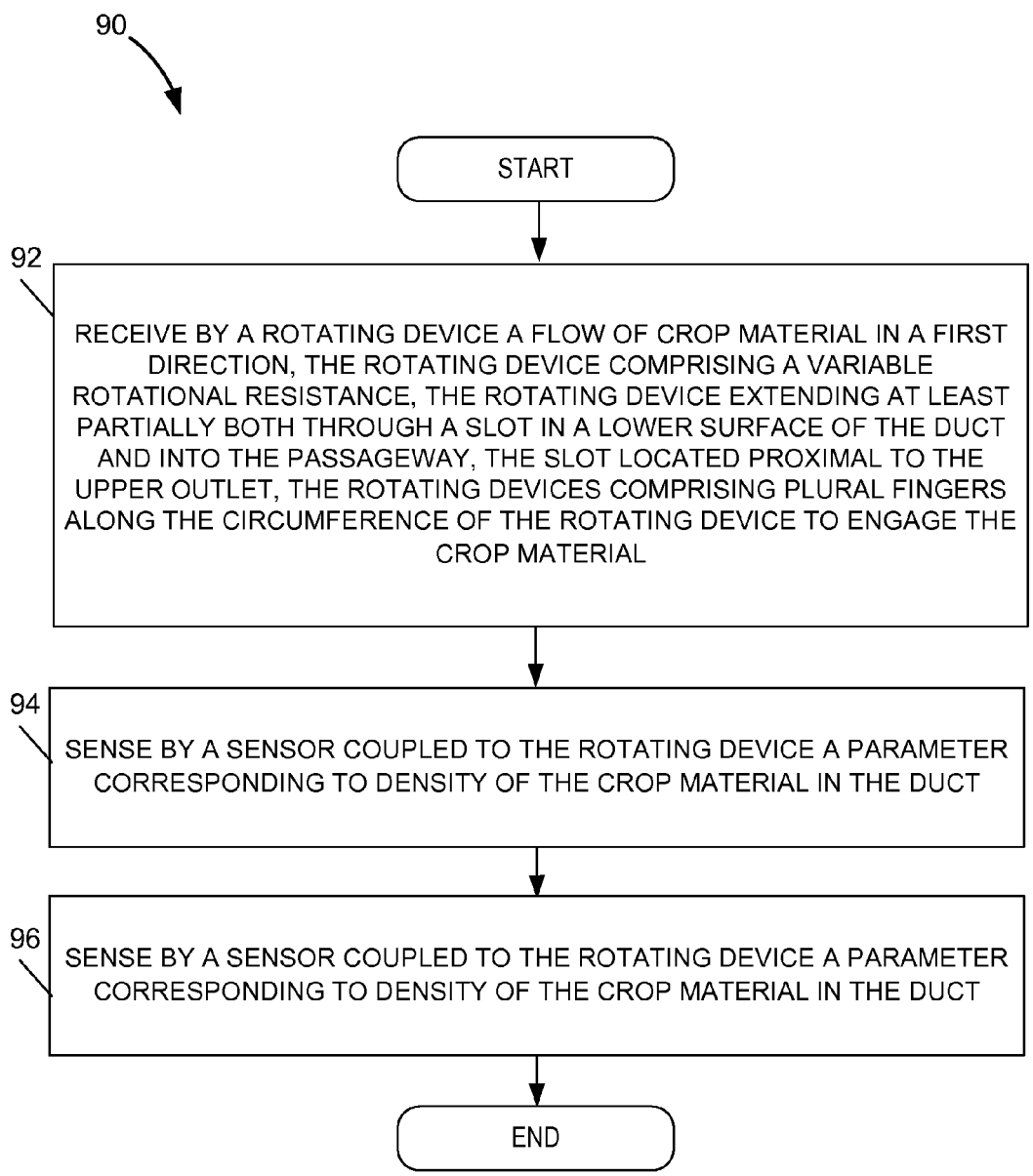
FIG. 5 is a flow diagram that illustrates an example method embodiment.

Having described certain embodiments of a stuffer chute assembly and constituent components or sub-assemblies, it should be appreciated that one method embodiment, shown in FIG. 5 and denoted as method 90, involves a method for detecting fullness of crop material in a stuffer chute assembly, the stuffer chute assembly comprising a duct defining a passageway, the duct having a lower inlet opening and an upper outlet opening. In one embodiment, the method comprises receiving by a rotating device a flow of crop material in a first direction, the rotating device comprising a variable rotational resistance, the rotating device extending at least partially both through a slot in a lower surface of the duct and into the passageway, the slot located proximal to the upper outlet, the rotating devices comprising plural fingers along the circumference of the rotating device to engage the crop material (92); sensing by a sensor coupled to the rotating device a parameter corresponding to density of the crop material in the duct (94); and communicating a trigger signal to a controller responsive to a threshold value of the sensed parameter, the controller associated with a stuffer cycle (96).

Although the flow diagram of FIG. 5 shows a specific order of execution, it is understood that the order of execution may differ from that which is depicted. Further, the method described in FIG. 5 is not limited to the architectures described herein.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A stuffer chute assembly comprising:
 a curvilinear duct defining a passageway, the duct having a lower inlet opening and an upper outlet opening, the duct comprising a lower surface with plural slots located proximal to the upper outlet opening;
 plural rotating devices arranged transversely across the duct, the plural rotating devices extending at least partially both through the plural slots and into the passageway, each of the plural rotating devices comprising plural fingers along the circumference of the rotating device to engage crop material in the duct; and
 a sensor coupled to at least one of the plural rotating devices, the sensor configured to sense a parameter corresponding to density of the crop material in the duct.

2. The stuffer chute assembly of claim 1, wherein each of the plural rotating devices comprise a star wheel.

3. The stuffer chute assembly of claim 1, wherein the plural rotating devices are coupled to either a common shaft or independent from each other.

4. The stuffer chute assembly of claim 1, wherein the plural rotating devices passively rotate when the crop material engages the fingers.

5. The stuffer chute assembly of claim 1, wherein the plural rotating devices actively rotate via the application of power rotating the plural rotating devices.

6. The stuffer chute assembly of claim 1, wherein the fingers are either straight edged or curved.

7. The stuffer chute assembly of claim 1, wherein each of the plural rotating devices are coupled to a respective electrical or mechanical sensor that includes the sensor.

8. The stuffer chute assembly of claim 1, wherein the plural rotating devices are coupled to the sensor, the sensor configured as either an electrical or mechanical sensor that includes the sensor.

9. The stuffer chute assembly of claim 1, wherein the parameter comprises one or a combination of torque, pressure, weight, current draw, voltage loss, resistance, or power.

10. The stuffer chute assembly of claim 1, wherein the sensor is further configured to communicate a trigger signal to a controller responsive to a threshold value of the sensed parameter, the controller associated with a stuffer cycle operation.

11. The stuffer chute assembly of claim 10, wherein the plural rotating devices are configured to rotate only in a single direction responsive to receiving a signal from the controller, the signal sent responsive to receipt by the controller of the trigger signal.

12. The stuffer chute assembly of claim 10, wherein the plural rotating devices are configured to rotate only in a single direction responsive to receiving the trigger signal.

13. The stuffer chute assembly of claim 1, wherein the plural rotating devices are configured to rotate only in a single direction.

14. The stuffer chute assembly of claim 1, wherein each of the plural rotating devices comprises a variable rotational resistance.

15. The stuffer chute assembly of claim 14, wherein each of the plural rotating devices exhibit no change in resistance to crop material flow until a threshold amount of crop material resides in the duct.

16. The stuffer chute assembly of claim 14, wherein the rotational resistance is adjustable.

17. A stuffer cycle system for a baler, the system comprising:
 a stuffer comprising a moveable rake;
 a plunger assembly;
 a curvilinear duct defining a passageway, the duct having a lower inlet opening and an upper outlet opening, the duct comprising a lower surface with plural slots located proximal to the upper outlet opening, the duct comprising upper slots through which the rake is configured to sweep a charge material through the upper outlet opening for engagement with the plunger assembly;
 a controller;
 plural rotating devices arranged transversely across the duct, the plural rotating devices extending at least partially both through the plural slots and into the passageway, each of the plural rotating devices comprising plural fingers along the circumference of the rotating device to engage crop material in the duct, each of the rotating devices comprising a variable rotational resistance; and
 a sensor coupled to at least one of the plural rotating devices, the sensor configured to:
 sense a parameter corresponding to density of the crop material in the duct; and
 communicate a trigger signal to the controller responsive to a threshold value of the sensed parameter,
 wherein the controller is configured to receive the trigger signal, and responsively and sequentially cause actuation of the rake and the plunger assembly according to a single stuffer cycle.

* * * * *